US007788715B2

(12) United States Patent
Naftali

(10) Patent No.: US 7,788,715 B2
(45) Date of Patent: Aug. 31, 2010

(54) AUTHENTICATION FOR TRANSMISSION CONTROL PROTOCOL

(75) Inventor: Amir Naftali, Tel Aviv (IL)

(73) Assignee: Cisco Technology, Inc., San Jose, CA (US)

( * ) Notice: Subject to any disclaimer, the term of this patent is extended or adjusted under 35 U.S.C. 154(b) by 1116 days.

(21) Appl. No.: 10/733,666

(22) Filed: Dec. 10, 2003

(65) Prior Publication Data

US 2005/0132214 A1 Jun. 16, 2005

(51) Int. Cl.
*G06F 9/00* (2006.01)
*G06F 15/16* (2006.01)
*G06F 17/00* (2006.01)
*H04L 9/32* (2006.01)
*B41K 3/38* (2006.01)
*H04K 1/00* (2006.01)

(52) U.S. Cl. .......................... 726/15; 713/168; 380/59; 380/270

(58) Field of Classification Search ............... 726/15
See application file for complete search history.

(56) References Cited

U.S. PATENT DOCUMENTS

| 6,779,033 | B1 | 8/2004 | Watson et al. | |
| 6,996,714 | B1 | 2/2006 | Halasz et al. | |
| 2002/0042820 | A1* | 4/2002 | Strom | 709/219 |
| 2002/0147909 | A1* | 10/2002 | Mullen et al. | 713/173 |
| 2004/0148504 | A1* | 7/2004 | Forsberg | 713/168 |

OTHER PUBLICATIONS

RFC 2284, L. Blunk & J. Vollbrecht, Mar. 1998, PPP Extensible Authentication Protocol (EAP), Merit Network Inc., Network Working Group.*
RFC 1994, W. Simpson, Aug. 1996, PPP Challenge Handshake Authentication Protocol (CHAP), DayDreamer, Network Working Group.*
"PPP Extensible Authentication Protocol (EAP)," RFC 2284, L. Blunk & J. Vollbrecht, Merit Network Inc., Network Working Group, Mar. 1998.*
"PPP Challenge Handshake Authentication Protocol (CHAP)," RFC 1994, W. Simpson, DayDreamer, Network Working Group, Aug. 1996.*
"Introduction to Parallel Processing—Algorithms and Architectures," Parhami, Plenum Press, New York, 1999.*
Protection of BGP Sessions Via the TCP MD5 Signature Option, A. Heffernan, Cisco Systems, Aug. 1998, @http://www.rfc-editor.org/rfc/rfc2385.txt.
W. Simpson, Network Working Group, "The Point-to-Point Protocol (PPP)", Request for Comments: 1661, Daydreamer STD: 51, Jul. 1994, 56 pages.

* cited by examiner

*Primary Examiner*—Nasser Moazzami
*Assistant Examiner*—Oscar A Louie
(74) *Attorney, Agent, or Firm*—Trellis IP Law Group, PC

(57) ABSTRACT

An embodiment of the invention incorporates, or encapsulates, authentication mechanisms into an initiation phase of a transmission protocol session. In a preferred embodiment, Extensible Authentication Protocol (EAP) authentication steps are included in the three-way handshake of a request to establish a Transmission Control Protocol/Internet Protocol TCP/IP) session. An EAP authentication session request can be designated within the standard Transmission Control Protocol (TCP) segment by using unused flags in the segment header. Another way to designate the request is to include a predefined option value in the header.

17 Claims, 7 Drawing Sheets

```
Server to Client EAP/TCP header (using the 4th bit)
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Source Port          |       Destination Port        |
+-+-+-+-+-+-+-+-+-+-+-+-+-+-+-+-+-+-+-+-+-+-+-+-+-+-+-+-+-+-+-+-+
|                        Sequence Number                        |
+-+-+-+-+-+-+-+-+-+-+-+-+-+-+-+-+-+-+-+-+-+-+-+-+-+-+-+-+-+-+-+-+
|                    Acknowledgment Number                      |
+-+-+-+-+-+-+-+-+-+-+-+-+-+-+-+-+-+-+-+-+-+-+-+-+-+-+-+-+-+-+-+-+
| Data  |     |E|   |U|A|P|R|S|F|                               |
| Offset| Rese|A|   |R|C|S|S|Y|I|            Window             |
|       | rved|P|   |G|K|H|T|N|N|                               |
+-+-+-+-+-+-+-+-+-+-+-+-+-+-+-+-+-+-+-+-+-+-+-+-+-+-+-+-+-+-+-+-+
|           Checksum            |         Urgent Pointer        |
+-+-+-+-+-+-+-+-+-+-+-+-+-+-+-+-+-+-+-+-+-+-+-+-+-+-+-+-+-+-+-+-+
|                    Options                    |    Padding    |
+-+-+-+-+-+-+-+-+-+-+-+-+-+-+-+-+-+-+-+-+-+-+-+-+-+-+-+-+-+-+-+-+
|                              data                             |
+-+-+-+-+-+-+-+-+-+-+-+-+-+-+-+-+-+-+-+-+-+-+-+-+-+-+-+-+-+-+-+-+
```

Fig. 6

```
Client to Server EAP/TCP header (using the 2d bit)
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Source Port          |       Destination Port        |
+-+-+-+-+-+-+-+-+-+-+-+-+-+-+-+-+-+-+-+-+-+-+-+-+-+-+-+-+-+-+-+-+
|                        Sequence Number                        |
+-+-+-+-+-+-+-+-+-+-+-+-+-+-+-+-+-+-+-+-+-+-+-+-+-+-+-+-+-+-+-+-+
|                    Acknowledgment Number                      |
+-+-+-+-+-+-+-+-+-+-+-+-+-+-+-+-+-+-+-+-+-+-+-+-+-+-+-+-+-+-+-+-+
| Data  |  |E|Rese  |U|A|P|R|S|F|                               |
| Offset|  |A|rved  |R|C|S|S|Y|I|            Window             |
|       |  |P|      |G|K|H|T|N|N|                               |
+-+-+-+-+-+-+-+-+-+-+-+-+-+-+-+-+-+-+-+-+-+-+-+-+-+-+-+-+-+-+-+-+
|           Checksum            |         Urgent Pointer        |
+-+-+-+-+-+-+-+-+-+-+-+-+-+-+-+-+-+-+-+-+-+-+-+-+-+-+-+-+-+-+-+-+
|                    Options                    |    Padding    |
+-+-+-+-+-+-+-+-+-+-+-+-+-+-+-+-+-+-+-+-+-+-+-+-+-+-+-+-+-+-+-+-+
```

AUTHENTICATION FOR TRANSMISSION CONTROL PROTOCOL

BACKGROUND OF THE INVENTION

This invention is related in general to digital networks and more specifically to providing authentication services in association with a transmission control protocol.

Security plays an important role in exchanges of information in digital networks. Because of the prevalent use of networks such as the Internet, corporate and campus intranets, local area networks (LANs), etc., valuable and sensitive data is often transferred in way that might make the transferred data accessible to unwanted or unauthorized "attackers."

One way that the prior art attempts to prevent unauthorized access to data is to require a user or device seeking access to information to authenticate the user or device's identity. For example, a popular Extensible Authentication Protocol (EAP) includes authentication mechanisms that are used by popular networks such as the wireless network standard specified by the 802.1×type of networks (i.e., "WiFi"), IEEE 1394 (i.e., FireWire), etc. Other networks and protocols also use EAP-based authentication. See, e.g., "PPP Extensible Authentication Protocol (EAP)," L. Blunk, J. Vollbrecht, Request for Comments: 2284, March 1998.

The EAP approach uses an Authentication Server that is consulted by an access point device. The access point device can be, e.g., a wireless access point from which a user, or client, must seek access. The access point device controls access to information by allowing users only limited access (e.g., via restricted ports) to information on a network. Once a user is authenticated then the user is placed onto a port with less restrictions and greater access.

To obtain access, a user device requests an EAP handshake from the access point. The access point establishes a port for EAP-only traffic and asks the user device for an identity (e.g., of the device, client, etc.). The user device supplies the requested identity. The access point then contacts the Authentication Server with the identity. The Authentication Server checks the identity against a database (e.g., by comparing a supplied password to a list of passwords and IDs) and responds with authentication approval or denial. The access point then grants access accordingly.

Although some existing protocols and standards successfully support integrated authentication there are other protocols that do not have the benefit of having been developed initially with authentication mechanisms in mind, or that are not readily equipped to support adequate authentication and other security features. Many protocols are not secure and permit plaintext (or base64 encoding) credentials to be transmitted through the network. When such protocols are extended to later support authentication, such authentication extensions are typically limited in their ability.

For example, the popular Transmission Control Protocol/Internet Protocol (TCP/IP) is an older, widespread standard transport protocol for exchange of information over the Internet. It is desirable to improve security features, such as authentication, to the TCP/IP protocol because of its prevalence, popularity and support within the existing Internet infrastructure and community.

One drawback with traditional authentication methods using TCP/IP is that a regular TCP/IP session is established before authentication starts. Therefore, TCP resources are already in use before a session is authenticated and this could be an exploited weakness. Also, in typical applications where a centralized Authentication, Authorization and Accounting (AAA) server is used, some of the authentication takes place at the application protocol level, requiring bridging between application protocols and AAA protocols that can represent another weakness.

Before a TCP/IP transfer of information occurs, a connection is established. The connection is established using a so-called "three-way handshake." FIG. 1 illustrates, a three-way handshake between a TCP client process seeking to establish a connection with a TCP server. In FIG. 1, the client sends a TCP segment including a synchronization flag to the server (SYN==1).

The synchronization segment requests the server to synchronize to the client's sequence number, N1. In a second step, the server responds with a segment including an acknowledgement using the sequence number sent from the client incremented by one (N1+1). The server's segment also includes a request for synchronization to the server's sequence number, N2. Finally, in a third step, the client sends a segment including an acknowledgement using the server's sequence number incremented by one (N2+1). The client's acknowledgment of the server's request for synchronization completes the process of establishing a reliable connection by using the three-way handshake.

SUMMARY OF EMBODIMENTS OF THE INVENTION

An embodiment of the invention incorporates, or "encapsulates," authentication mechanisms into an initiation phase of a transmission protocol. In a preferred embodiment, EAP authentication steps are included in handshake steps of a request to establish a TCP/IP session. An EAP authentication session request can be designated within the standard TCP segment by using unused flags in the segment header. Another way to designate the request is to include a predefined option value in the header.

BRIEF DESCRIPTION OF THE DRAWINGS

FIG. 6 is a first example of a TCP header using an authentication session flag;

FIG. 7 is a second example of a TCP header using an authentication session flag.

DETAILED DESCRIPTION OF EMBODIMENTS OF THE INVENTION

A preferred embodiment of the invention encapsulates an authentication session request into standard TCP segment exchanges such as the type used to establish a TCP connection. When a server receives a request for a TCP connection from a client, the server can optionally respond with a TCP segment that includes an authentication session request. If the client can detect and comply with the authentication session request then the client is entered into an authentication session, such as an EAP session, for purposes of authenticating the client. If authentication is successful then the client is provided with the originally-requested TCP connection by the server completing the handshake and letting the client establish the TCP session. If the client is unable to detect and comply with the authentication session, or if the authentication fails, then the client is not provided with the requested TCP connection (i.e., the connection is refused by the server and the handshake is never completed), or other optional action can be taken.

In one embodiment, a client can comply with a server request to enter an authentication session (as a result of the client's request to start a TCP session) by sending a SYN, ACK response that also includes a reply to the authentication request. The reply is distinguished by having a special authorization (or "AUTH") flag set to 1, indicating that the client can, and will, process authentication requests, such as EAP authentication requests. When the server receives the client reply the server sends EAP protocol encapsulated within TCP segments. Since the authentication session occurs within a handshake transaction typically used to establish a TCP connection in three segment transfers (i.e., a three-way handshake), this approach effectively extends a standard handshake session until an encapsulated EAP session completes and the TCP server receives notice that the client is authenticated.

Figure 1:
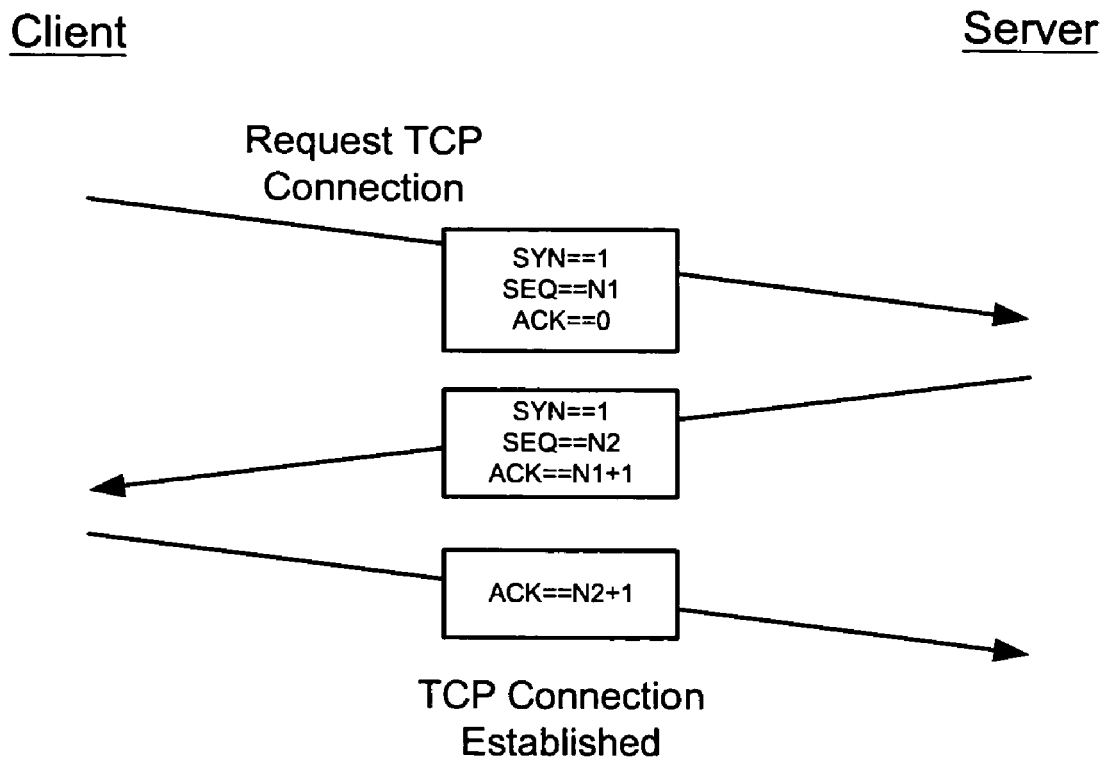
FIG. 1 illustrates a prior art three-way handshake for a TCP connection.
Figure 2:
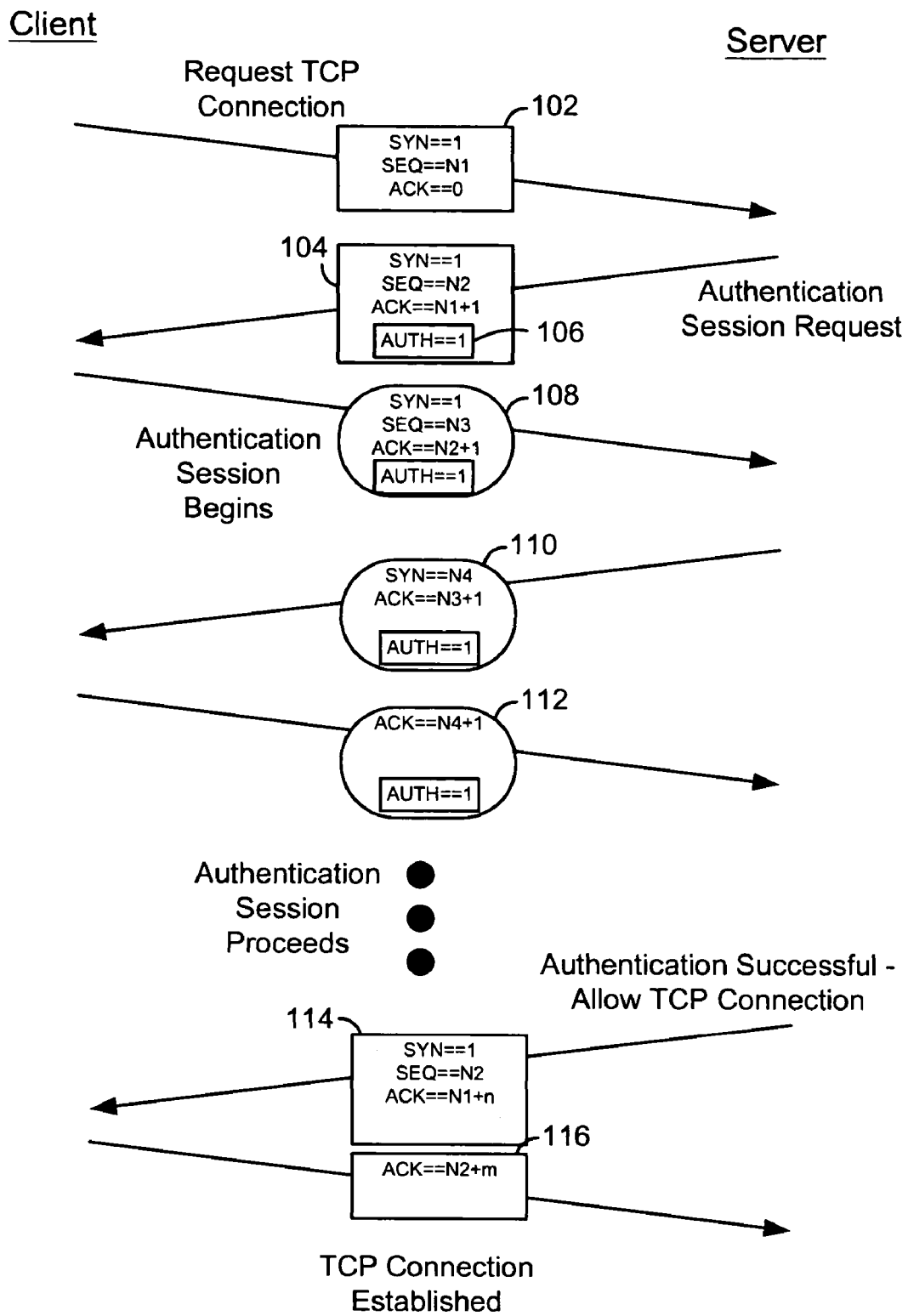
FIG. 2 illustrates an authentication session request and processing encapsulated in a TCP connection three-way handshake.

FIG. 2 illustrates a preferred embodiment of the invention.

In FIG. 2, a client sends a request for a TCP connection by sending segment 102. As in the prior art standard request for a TCP connection, the segment includes a request for the server to synchronize to the client sequence number, N1. Note that, for ease of discussion, other information usually provided with a segment is omitted. segment 102 is not in response to any segment from the server so the acknowledgement value is set to zero (ACK=0).

The server sends back segment 104 in response to receiving segment 102 from the client. Segment 104 includes information similar to a standard response to a request for a TCP connection: Specifically, segment 104 includes an acknowledgement using the client's sequence number incremented by one (N1+1) and also includes a request that the client synchronize to the server's sequence number, N2. Segment 104 also includes authorization session request 106. In one embodiment, authorization session request 106 includes setting a flag in the TCP header. In a traditional TCP header format, the flag is normally not used. One bit is used for segments passing from the server to the client while the other bit is used for segments passing from the client to the server. These bits can be used for both the authentication session negotiation and for the authentication session, itself. FIGS. 6 and 7 show an example of the server-to-client EAP/TCP header and the client-to-server EAP/TCP header, respectively. In FIG. 6, the server-to-client EAP/TCP header is shown using the 4$^{th}$ unused flag. In FIG. 7, the client-to-server EAP/TCP header is shown using the 2$^{nd}$ unused flag.

Another embodiment allows an authentication session request to be signaled by using a "single octet of option-kind" as specified in RFC 793. Where this option exists in the TCP header the packet is marked as an EAP/TCP packet and the client/server must unwrap the EAP data and act according to the EAP protocol. While any suitable values can be used, a preferred embodiment uses 00001110 as the server-to-client option value and 00001010 as the client-to-server option value. Other embodiments can use other values. For example, suitable values can be negotiated with appropriate organizations or standards bodies. In some applications it may not be necessary to have separate values for server-to-client and client-to-server segments. In yet other embodiments it may be beneficial to use more than two values to designate different types of messages, conditions, controls, or for other reasons.

Naturally, other embodiments can use different flags, or different approaches or ways to indicate an authentication session request. For example, other information in the header, or elsewhere in a segment, can be used. Additional segments or segments, or other signaling methods can be used. However, it is desirable to fit the authentication session request into the standard format for a TCP header so that if a client is not equipped to support an authentication session then the client can process the segment normally. When the server detects that the client has responded to an authentication session request by responding, as normal, to the TCP handshake then the server can refuse to allow the connection. The server can refuse the connection by ceasing responses to the client and not establishing a socket connection.

Another possibility is for the server to respond with a segment 104 that is not a normal segment in response to the client's segment 102. For example, the server can reply with an acknowledgement value that is not the sequence value. In such a case a client that is not equipped to detect the authorization session request will be unable to obtain a connection and the error can be processed according to a standard routine. However, if the client is able to detect the authorization session request then the abnormal segment information can be ignored while processing continues.

After the client receives segment 104, and assuming the client can detect authorization session request 106, the client initiates an authentication session by sending a segment such as 108 with AUTH flag set to 1. When the server receives segment 108 the authentication process starts. Subsequent segments in the authorization session include AUTH set to 1. In an EAP negotiation this segment includes a request for synchronizing to the client's sequence number, N3. If the segment is sent to the server then the server's sequence number is used in the acknowledgement as N2+1. Communication with other processes (e.g., other servers or devices) can be handled in accordance with EAP protocols or other transmission protocols. For example, a scenario where the authentication proceeds with an intercepting device is discussed below.

The server sends back segment 110 that includes a request for synchronizing the EAP session using sequence number N4 and acknowledges using the client sequence number for the authentication session (N3+1). The client proceeds with the authentication session by providing, e.g., requested information and acknowledging in segment 112. The authentication session can proceed as desired until the client is authenticated or fails authentication.

Assuming the authentication is successful, the server sends segment 114 using the client's sequence number for the original TCP connection request, N1+n where n is the number of segments used since the start of the TCP+Authentication session, or where n is calculated to be a next acceptable number in the sequence. The client responds with an acknowledgement using the server's originally-sent TCP session sequence number, N2+m, to complete the TCP three-way handshake and obtain a TCP connection. Thus, using the encapsulated approach of the illustrated embodiments, the TCP connection can be prevented from taking place depending on an authentication session. The authentication session information is exchanged within the TCP stack so that the information does not have to be passed to application programs or processes that could represent a weakness to a security system. The authentication processing can also be made transparent to the application layer, if desired, unless it is necessary to involve the application layer in the authentication process as, for example, to obtain information (e.g., username, device ID, password, etc.) from the application.

Steps can be taken to prevent authentication session data from being available at the application layer, or other layers. For example, the client and server can each buffer authentication session information as described in RFC 793 with the exception of EAP data which should not be buffered at both client and server. Data can be processed internal to the TCP stack without reaching the application layer (or other layers).

Figure 3:
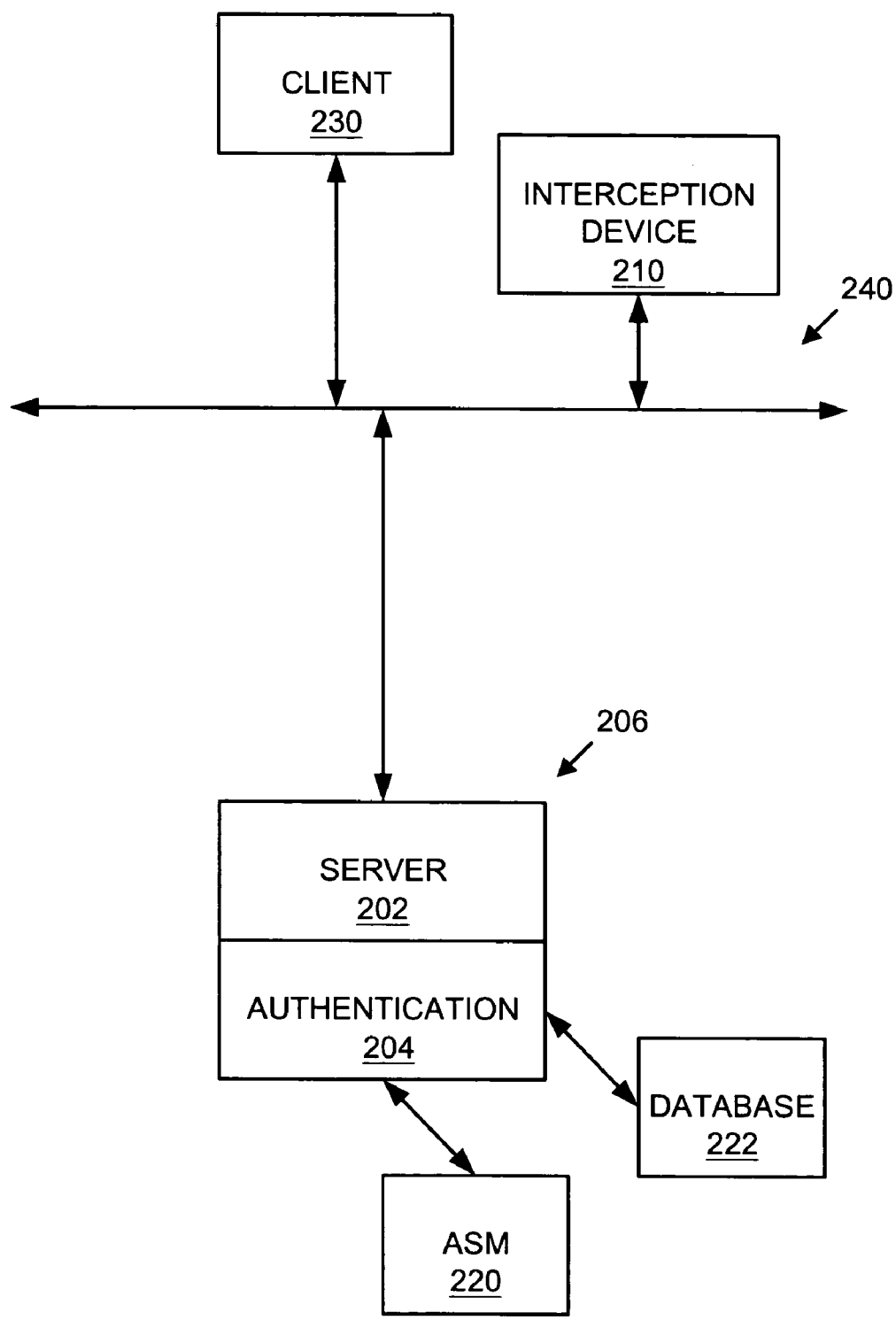
FIG. 3 illustrates basic components that can be used in connection with the present invention.

The type of authentication can vary according to a particular implementation. For example, a centralized AAA server can be used, as shown in FIG. 3. An authentication process 204 can operate within the same physical device 206 as server process 202. Authentication process 204 can use other processes to manage resources, configure service equipment to provide authorized services, participate in the authorization decision, and perform other functions. Database 222 can be used to index authorization data and apply authorization rules.

In one embodiment client 230 may initially try to connect to server 202 but can be intercepted by interception device 210 on network 240. This scenario may be useful, for example, where a firewall is protecting a data center; or in FireWire-type of networks where communications necessarily flow through many devices on the network. In such an approach, interception device 210 can perform one or more of the transmissions of FIG. 2, discussed above.

Figure 4:
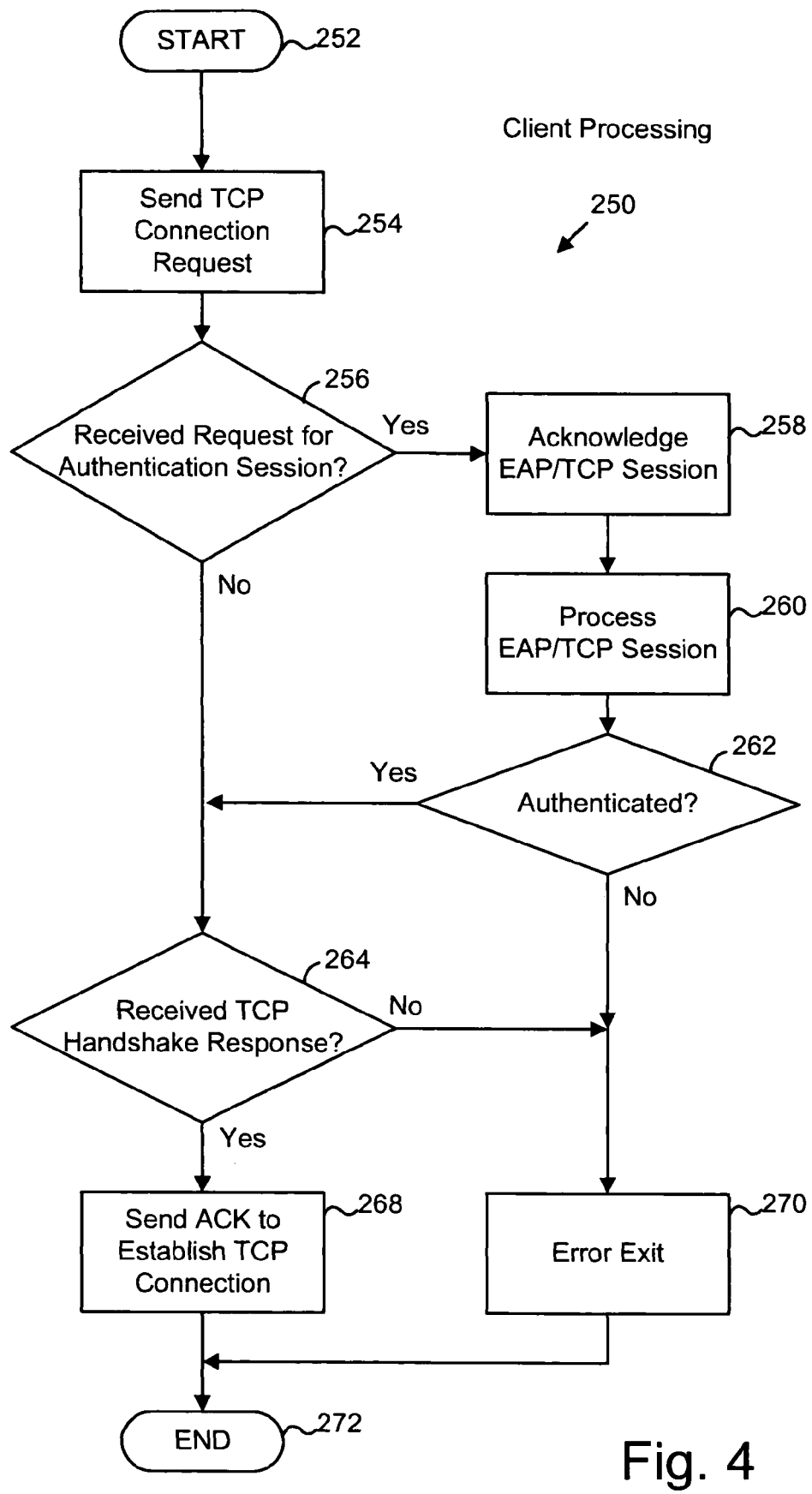
FIG. 4 is a flowchart showing client processing of a TCP/Authentication Session.

FIG. 4 is a flowchart showing client processing of a TCP/Authentication Session such as is illustrated in FIG. 2.

In FIG. 4, a process or routine corresponding to flowchart 250 is entered at step 252 when it is desired to initiate a TCP connection. Step 254 is executed to send a TCP connection request to a server (or other server or device; subject to interception, etc.). At step 256 a check is made as to whether information received by the client from the server includes an authentication session request. If so, execution proceeds to steps 258-262 where the authentication session is processed.

At step 258 the client acknowledges the EAP/TCP (or other authentication and/or transmission control) session. At step 260 the client continues to participate in the EAP/TCP session that ends in a successful, or failed, authentication. If authentication is not successful then client execution can proceed to step 270 where the client can take error handling steps. For example, the transport layer can report the failed authentication to an application program for handling.

If authentication is successful at step 262, or if the check at step 256 determines that a request for an authentication session was not received in response to the connection request, step 264 is executed to check whether the client has received a TCP handshake response. If not, an error termination takes place via step 270. If the client has received a TCP handshake response then step 268 is executed so that the client sends an acknowledgement to establish the TCP connection. Processing of the routine terminates at step 272.

Note that steps of the illustrated flowcharts and described methods can be performed in hardware or software, as desired. Steps can be added to, taken from or modified from the steps presented in this specification without deviating from the scope of the invention. In general, the flowcharts, diagrams and steps are only used to indicate one possible sequence of basic operations to achieve a functional aspect of the present invention. For example, in FIG. 4, step 262 of determining whether authentication has occurred can be identical with step 264 that checks for a TCP handshake response.

In other words, as discussed above, the server resuming the three-way handshake response (e.g., segment 114 of FIG. 2) can be an indication that authentication was successful. Many other modifications are possible.

Figure 5:
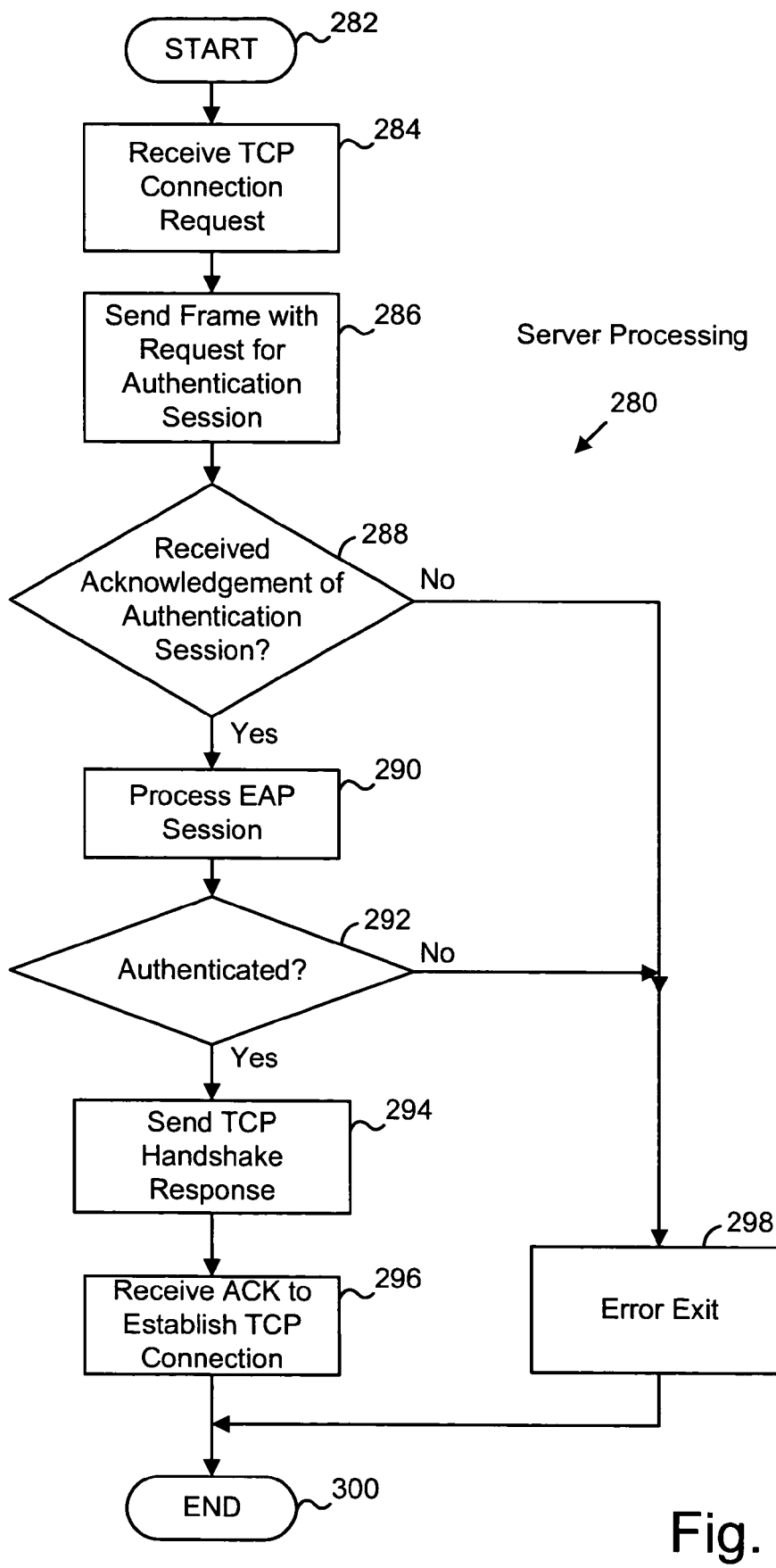
FIG. 5 is a flowchart showing server processing of a TCP/Authentication Session.

FIG. 5 is a flowchart showing server processing of a TCP/Authentication Session such as illustrated in FIG. 2.

In FIG. 5, a process or routine corresponding to flowchart 280 is entered at step 282 to handle an incoming connection request from a client or other process or device. At step 284 the TCP connection request is received. At step 286 the server sends a communication (e.g., a segment) with a request for an authentication session. At step 288 a check is made as to whether the client has sent acknowledgement of the authentication session. If not, the routine can make an error exit via steps 298 and 300.

If acknowledgement of the authentication session is received at step 288 then execution proceeds to step 290 where the server processes the authentication session. As described above, the authentication session processing can take any number of forms as desired. Any type of standard, custom or future authentication can be performed once the start of the authentication session has been negotiated.

At step 292 the server determines whether authentication was successful. If not, the routine error exits via steps 298 and 300. If authentication was successful the routine executes step 294 to resume the transmission control three-way handshake by sending a standard response. Step 296 is executed to detect receipt of an acknowledgement from the client to complete the handshake and establish the transmission control connection. The routine exits at step 300.

Figure 8:
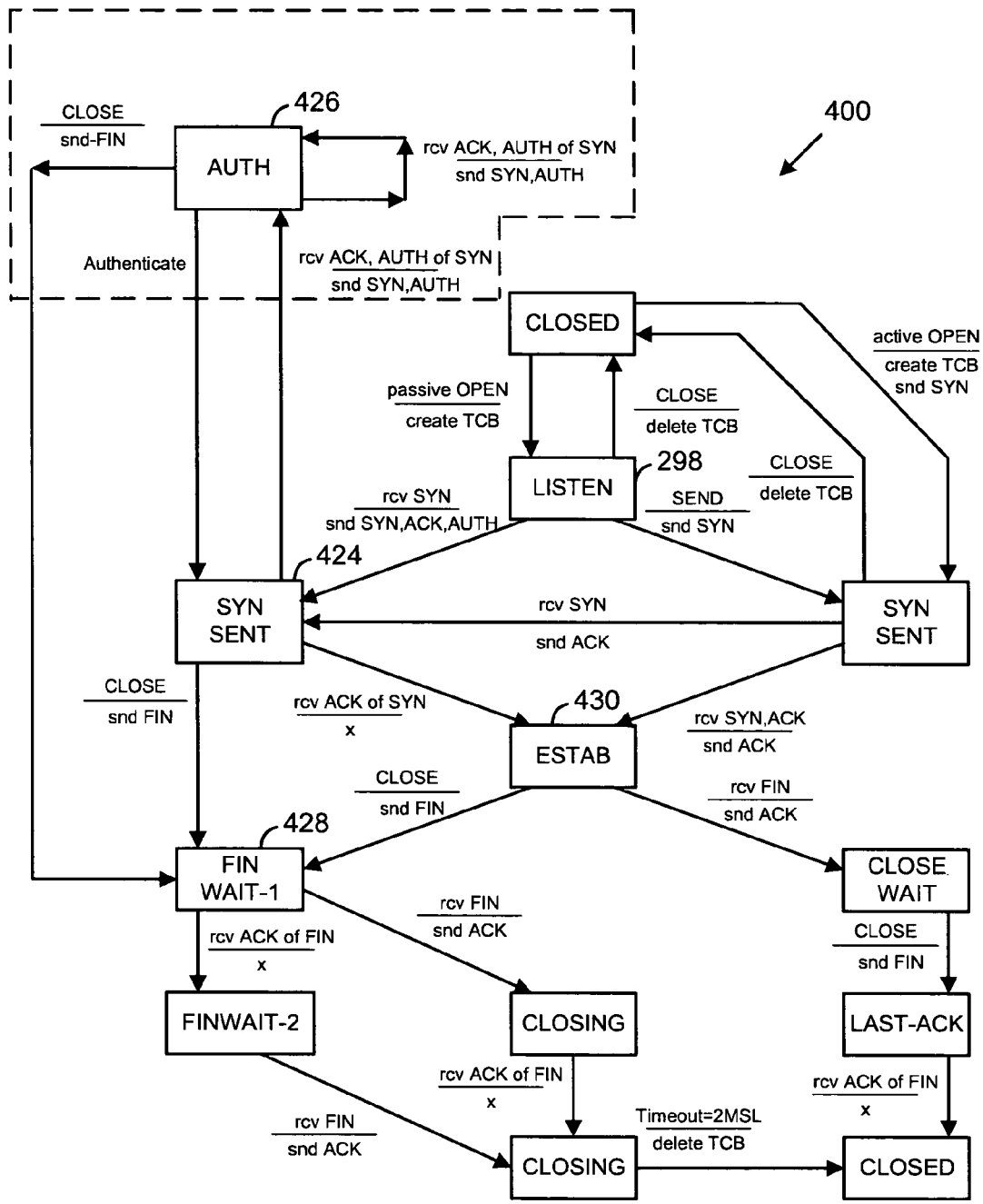
FIG. 8 is a state machine diagram showing modifications to a TCP state machine to handle an authentication session according to an embodiment of the invention.

FIG. 8 shows a state diagram including processing for a standard TCP session with the inclusion of an authentication session according to an embodiment of the invention. In FIG. 8, assume that a server is in LISTEN state 422 and a synchronization segment is received from a client to start a TCP session. The server enters SYN SENT state 424 and sends a segment with SYN, ACK and AUTH flags to indicate a response to the client but also that an authentication session is to begin.

If the server receives a proper acknowledgement with authorization session recognized from the client then the server enters AUTH state 426 and processing of the authorization session within dashed box 410 takes place. During authorization any number of segments can be transferred among the server (or other authorization process) and the client (or other process). If authentication fails then the server state proceeds from AUTH state 426 to FIN WAIT-1 state 428 and the session is closed. However, if authorization is successful then the server enters SYN SENT state again and the state proceeds to ESTAB state 430 where a TCP session is established. Other aspects of TCP processing are shown by other states and state transitions in the diagram.

Although the invention has been discussed with respect to specific embodiments thereof, these embodiments are merely illustrative, and not restrictive, of the invention. For example, although EAP and TCP/IP have been used as examples in specific embodiment, other embodiments can use other standards including different authentication systems and approaches, and different transmission protocols. Also, it should be understood that where specific terminology that is native to a particular standard or specification (e.g., EAP, TCP/IP, etc.) is used that the terminology is not intended to limit the invention to particulars of the standard or specification. For example, the use of the words "segments," "frames," etc., should not limit the scope of the invention to standards that use those terms, nor should the invention be limited to any definitions of those units. In other words, aspects of the invention can work with any portion or type of information or data that is transferred in a protocol regardless of the size and format of the data portion being transferred.

Although specific methods for indicating an authentication session request in headers or data of TCP/IP segments have been disclosed, any suitable manner of indicating the authentication session request can be acceptable. Also, even though the invention has been described in a client/server, the terms "client" and "server" can include any type of device, operation or other process. The present invention can operate between any two processes or entities including users, devices, functional systems or combinations of hardware and software. Peer-to-peer networks and any other networks or systems where the roles of client and server are switched, change dynamically, or are not even present are within the scope of the invention.

Any suitable programming language can be used to implement the routines of the present invention including C, C++, JAVA™, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain or store data for use by or in connection with the instruction execution system, apparatus, system or device. The computer readable medium can be, by way of example only but not by limitation, an electronic, magnetic, optical, electromagnetic, or semiconductor system, apparatus, system, device, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method performed by a server processor executing computer executable instructions stored in a computer readable memory device, the method comprising:

receiving, at the server processor, a request from a client processor to establish a transmission control protocol (TCP) connection, wherein the TCP includes a link establishment phase and an authentication phase, wherein initiation of the link establishment phase occurs apart from the authentication phase, and wherein the receiving step and following steps occur during the link establishment phase;

creating an extensible authentication protocol (EAP) session request to the client processor while still in the link establishment phase, wherein the client processor enters an authentication session with the server processor as a result of receiving the EAP session request;

receiving a response from the client processor in response to sending the standard response;

determining whether the response from the client processor indicates that the client processor will comply with the authentication session; and if the client processor will not comply with the authentication session then performing a substep of restricting access of the client processor.

2. The method of claim 1 wherein the standard response includes a segment used in a three-way handshake.

3. The method of claim 1, wherein the standard response includes a value in a TCP segment header.

4. The method of claim 3, wherein a first value is set for data from the server processor to the client processor, and where a second value is set for data from the client processor to the server processor.

5. The method of claim 1, wherein the standard response includes a TCP option.

6. The method of claim 5, wherein the standard response includes an octet.

7. The method of claim 1, wherein the server processor intercepts a transmission from the client processor.

8. An apparatus comprising:
at least one server processor;
at least one client processor;
a network interface;
a computer-readable storage memory device on which is stored instructions configured to cause the at least one server processor to perform a method, the method comprising:

receiving, at the at least one server processor, a request from the at least one client processor to establish a transmission control protocol (TCP) connection, wherein the TCP includes a link establishment phase and an authentication phase, wherein initiation of the link establishment phase occurs apart from the authentication phase, and wherein the receiving step and following steps occur during the link establishment phase;

creating an extensible authentication protocol (EAP) session request;

encapsulating the EAP session request in a standard response to the request to establish the TCP connection; and sending the standard response containing the EAP session request to the at least one client processor while still in the link establishment phase, wherein the at least one client processor enters an authentication session with the at least one server processor as a result of receiving the EAP session request;

receiving a response from the at least one client processor in response to sending the standard response;

determining whether the response from the at least one client processor indicates that the at least one client processor will comply with the authentication session; and if the at least one client processor will not comply with the authentication session then performing a substep of restricting access of the at least one client processor.

9. The apparatus of claim 8, wherein the transmission control protocol includes standard TCP.

10. The apparatus of claim 9, wherein the first portion of transmission control protocol data includes a request to establish a standard TCP connection.

11. The apparatus of claim 10 wherein the standard response includes a segment used in a three-way handshake.

12. The apparatus of claim 9, wherein the authentication session response includes a value in a TCP segment header.

13. The apparatus of claim 12, wherein a first value is set for data from the server processor to the client processor, and where a second value is set for data from the client processor to the server processor.

14. The apparatus of claim 9, wherein the authentication session item includes a TCP option.

15. The apparatus of claim 14, wherein the option includes an octet.

16. The apparatus of claim 8, wherein the authentication session includes an Extensible Authentication Protocol (EAP) session.

17. A computer-readable storage memory device storing instructions executed on a server processor, the server processor executing said instructions to perform a method comprising:

receiving, at the server processor, a request from a client processor to establish a transmission control protocol (TCP) connection, wherein the TCP includes a link establishment phase and an authentication phase, wherein initiation of the link establishment phase occurs apart from the authentication phase, and wherein the receiving step and following steps occur during the link establishment phase;

creating and extensible authentication protocol (EAP) session request;

encapsulating the EAP session request in a standard response to the request to establish the TCP connection; and sending the standard response containing the EAP session request to the client processor while still in the link establishment phase, wherein the client processor enters an authentication session with the server processor as a result of receiving the EAP session request;

receiving a response from the client processor in response to sending the standard response;

determining whether the response from the client processor indicates that the client processor will comply with the authentication session; and if the client processor will not comply with the authentication session then performing a substep of restricting access of the client processor.

* * * * *